US012339935B2

(12) United States Patent
Kanter et al.

(10) Patent No.: US 12,339,935 B2
(45) Date of Patent: Jun. 24, 2025

(54) INDUSTRY SPECIFIC MACHINE LEARNING APPLICATIONS

(71) Applicant: Alteryx, Inc., Irvine, CA (US)

(72) Inventors: James Max Kanter, Boston, MA (US); Kalyan Kumar Veeramachaneni, Watertown, MA (US)

(73) Assignee: Alteryx, Inc., Irvine, CA (US)

( * ) Notice: Subject to any disclaimer, the term of this patent is extended or adjusted under 35 U.S.C. 154(b) by 774 days.

(21) Appl. No.: 17/242,927

(22) Filed: Apr. 28, 2021

(65) Prior Publication Data

US 2022/0351004 A1    Nov. 3, 2022

(51) Int. Cl.
*G06N 20/00* (2019.01)
*G06F 18/20* (2023.01)
*G06F 18/2113* (2023.01)
*G06F 18/214* (2023.01)

(52) U.S. Cl.
CPC ........ *G06F 18/285* (2023.01); *G06F 18/2113* (2023.01); *G06F 18/214* (2023.01); *G06N 20/00* (2019.01)

(58) Field of Classification Search
CPC .. G06F 18/285; G06F 18/2113; G06F 18/214; G06N 20/00
See application file for complete search history.

(56) References Cited

U.S. PATENT DOCUMENTS

| | | | | |
|---|---|---|---|---|
| 11,853,853 | B1 * | 12/2023 | Beauchesne | ........ H04L 63/1433 |
| 2006/0200549 | A1 * | 9/2006 | Soto | ........ G16H 50/20 |
| | | | | 709/224 |
| 2018/0137219 | A1 * | 5/2018 | Goldfarb | ........ G06N 3/126 |
| 2019/0147371 | A1 * | 5/2019 | Deo | ........ G06N 20/20 |
| | | | | 706/12 |
| 2020/0327371 | A1 | 10/2020 | Sharma et al. | |
| 2020/0387818 | A1 | 12/2020 | Chan et al. | |
| 2020/0394533 | A1 | 12/2020 | Ramalingam et al. | |
| 2021/0042570 | A1 | 2/2021 | Iskandar et al. | |
| 2021/0065048 | A1 | 3/2021 | Salonidis et al. | |

(Continued)

OTHER PUBLICATIONS

PCT International Search Report and Written Opinion, PCT Application No. PCT/US 22/25903, Aug. 18, 2022, 12 pages.

(Continued)

*Primary Examiner* — Beau D Spratt
(74) *Attorney, Agent, or Firm* — FIG. 1 Patents

(57) ABSTRACT

A machine learning application is selected from a plurality of machine learning applications. Each machine learning application corresponds to a different industry problem and includes standard features and machine learning pipelines specific to the corresponding industrial problem. The machine learning application receives a dataset for generating a model for making a prediction for the industrial problem corresponding to the selected machine learning application. The standard features are provided for display for the user to map variables in the dataset to the standard features. Mapping by the user is received through the user interface. The machine learning pipelines are applied to the dataset to train a plurality of models based at least on the mapping. The trained models are ranked and one of the trained models is selected based on the ranking. The selected trained model is to be used for making the prediction based on new data.

20 Claims, 8 Drawing Sheets

(56) References Cited

U.S. PATENT DOCUMENTS

2023/0123236 A1* 4/2023 Kuebler ................ G06F 16/288
                                                        705/7.11
2023/0196115 A1* 6/2023 Arnon ..................... G06N 3/08
                                                         706/25
2023/0222178 A1* 7/2023 Singh ..................... G06F 18/40
                                                         706/45
2024/0070439 A1* 2/2024 Segars ................... G06N 3/094

OTHER PUBLICATIONS

"EP Search Report", EP Application No. 22796447.5, Feb. 24, 2025, 8 pages.
"Foreign Office Action", CA Patent Application 3216548, Dec. 17, 2024, 3 pages.

* cited by examiner

500

Receive, by a machine learning application, a dataset for generating a model, the machine learning application selected from a plurality of machine learning applications based on an industrial problem
510

Provide standard features in the machine learning application for display to a client device associated with user
520

Receive, from the client device and in response to providing the standard features, a mapping of variables in the dataset to standard features in the selected machine learning application
530

Apply the machine learning pipelines in the selected machine learning application to the dataset to train a plurality of models based at least on the mapping
540

Rank the plurality of trained models
550

Select a trained model from the plurality of trained models based on the ranking
560

FIG. 5

INDUSTRY SPECIFIC MACHINE LEARNING APPLICATIONS

BACKGROUND

Field of Art

The described embodiments pertain in general to processing data streams, and in particular to using industry specific machine learning applications to train models for making predictions based on the data streams.

Description of the Related Art

Automatic machine learning tools automate the process of applying machine learning to real-world problems. Current automatic machine learning tools allow for fast and efficient creation of deployable machine learning models. However, automatic machine learning tools often produce models that are sub-optimal because they do not incorporate domain knowledge pertaining to the dataset. Consequently, the models generated by currently available automatic machine learning tools are not as good as they could be at making predictions based on the data.

SUMMARY

The above and other issues are addressed by a method, a non-transitory computer-readable memory, and a system. An embodiment of the method is a method for generating a model for making a prediction for an industrial problem. The method includes receiving, by a machine learning application, a dataset for generating the model. The machine learning application is selected from a plurality of machine learning applications based on the industrial problem. Each of the plurality of machine learning applications corresponds to a different industrial problem and includes standard features specific to the corresponding industrial problem and machine learning pipelines specific to the corresponding industrial problem. The method further includes providing the standard features in the machine learning application for display to a client device associated with user. The method further includes receiving, from the client device and in response to providing the standard features, a mapping of variables in the dataset to standard features in the selected machine learning application. The method further includes applying the machine learning pipelines in the selected machine learning application to the dataset to train a plurality of models based at least on the mapping. The method further includes ranking the plurality of trained models. The method also includes selecting the generated model from the plurality of trained models based on the ranking.

An embodiment of the non-transitory computer-readable memory stores executable computer program instructions. The instructions are executable to perform operations for generating a model for making a prediction for an industrial problem. The operations include receiving, by a machine learning application, a dataset for generating the model. The machine learning application is selected from a plurality of machine learning applications based on the industrial problem. Each of the plurality of machine learning applications corresponds to a different industrial problem and includes standard features specific to the corresponding industrial problem and machine learning pipelines specific to the corresponding industrial problem. The operations further include providing the standard features in the machine learning application for display to a client device associated with user. The operations further include receiving, from the client device and in response to providing the standard features, a mapping of variables in the dataset to standard features in the selected machine learning application. The operations further include applying the machine learning pipelines in the selected machine learning application to the dataset to train a plurality of models based at least on the mapping. The operations further include ranking the plurality of trained models. The operations also include selecting the generated model from the plurality of trained models based on the ranking.

An embodiment of the system includes a computer processor for executing computer program instructions. The system also includes a non-transitory computer-readable memory storing computer program instructions executable by the computer processor to perform operations for generating a model for making a prediction for an industrial problem. The operations include receiving, by a machine learning application, a dataset for generating the model. The machine learning application is selected from a plurality of machine learning applications based on the industrial problem. Each of the plurality of machine learning applications corresponds to a different industrial problem and includes standard features specific to the corresponding industrial problem and machine learning pipelines specific to the corresponding industrial problem. The operations further include providing the standard features in the machine learning application for display to a client device associated with user. The operations further include receiving, from the client device and in response to providing the standard features, a mapping of variables in the dataset to standard features in the selected machine learning application. The operations further include applying the machine learning pipelines in the selected machine learning application to the dataset to train a plurality of models based at least on the mapping. The operations further include ranking the plurality of trained models. The operations also include selecting the generated model from the plurality of trained models based on the ranking.

BRIEF DESCRIPTION OF DRAWINGS

FIG. 5 is a flow chart illustrating a method of training a model by using industry specific machine learning applications according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
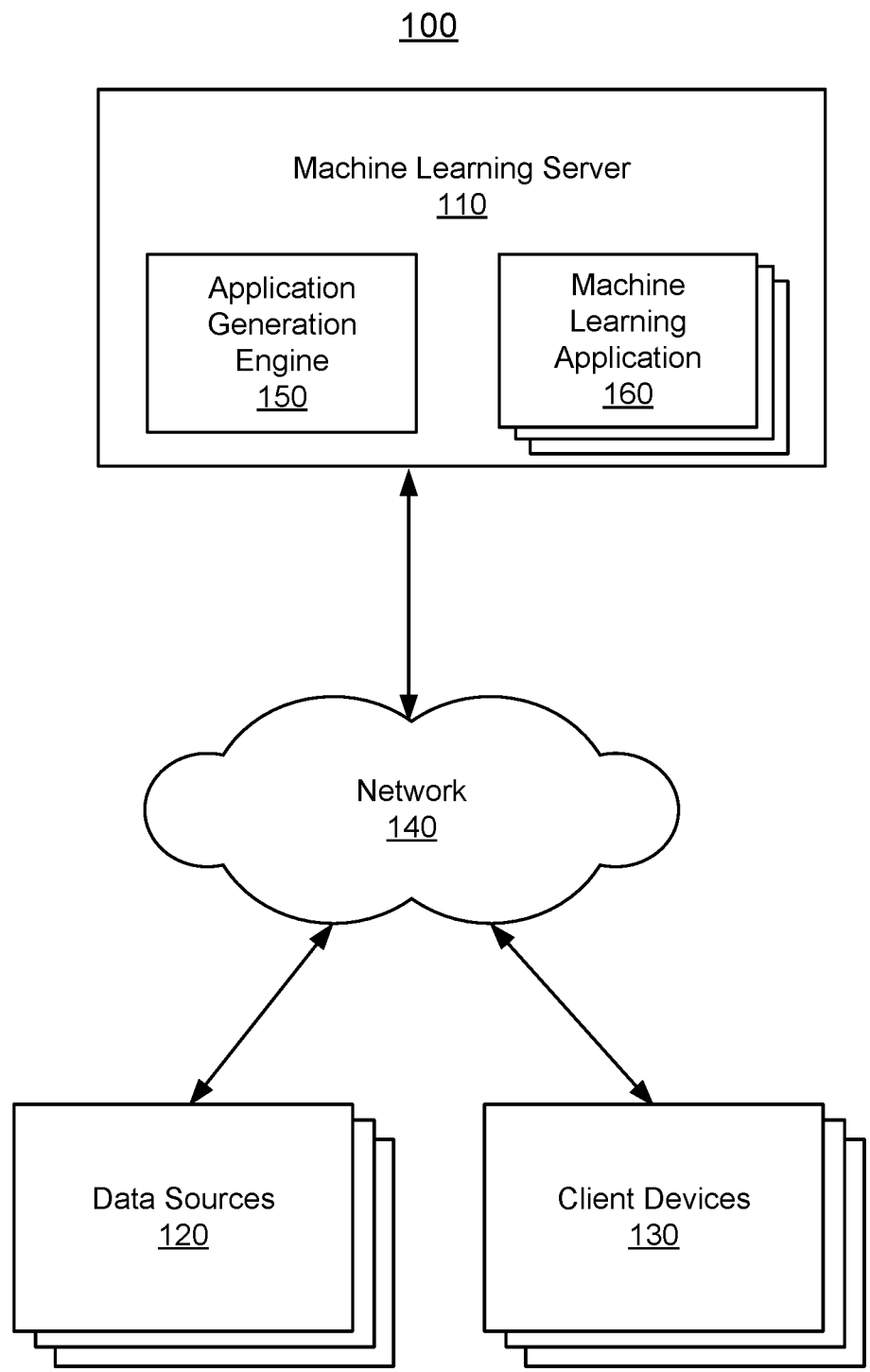
FIG. 1 is a block diagram illustrating a machine learning environment including a machine learning server according to one embodiment.

FIG. 1 is a block diagram illustrating a machine learning environment 100 including a machine learning server 110 according to one embodiment. The environment 100 further includes multiple data sources 120 and client devices 130 connected to the machine learning server 110 via a network 140. Although the illustrated environment 100 contains only one machine learning server 110 coupled to multiple data sources 120 and client devices 130, embodiments can have multiple machine learning servers, a singular data source, and a singular client device, or other variations thereof.

The machine learning server 110 is a computer-based system utilized for constructing machine learning models and deploying the models to make predictions based on data. The data are collected, gathered, or otherwise accessed from one or more of the multiple data sources 120 or one or more of the multiple client devices 130 via the network 140. The machine learning server 110 can implement scalable software tools and hardware resources employed in accessing, preparing, blending, and analyzing data from a wide variety of data sources 120 or client devices 130.

The machine learning server 110 implements industry specific machine learning processes. The machine learning server 110 includes an application generation application 150 and a plurality of industry specific machine learning applications 160 (also referred to as "machine learning applications 160;" individually referred to as "industry specific machine learning application 160" or "machine learning applications 160") generated by the application generation application 150. An industry specific machine learning application 160 is an application that can be used to train models for making predictions within the scope of a particular industry problem. An industry problem is a problem in the domain of an industry or business. The industry/domain can be, for example, information technology (IT) operations, healthcare, industrial manufacturing, retail, sales and marketing, insurance, banking, and so on. An industry problem can be, for example, application monitoring, service level agreement violation detection, user action prediction, and so on.

A machine learning application 160 specific to an industry problem includes machine learning tools (e.g., labeling function, standard features, machine learning pipelines, etc.) that have been generated by the machine learning server 110 for the particular industry problem. Such machine learning tools may be generated and/or selected based on domain knowledge of the industry problem, knowledge of historical training of models associated with the industry problem, other types of knowledge related to the industry problem, or some combination thereof. With these industry specific machine learning tools, the machine learning process is more efficient compared with conventional machine learning techniques. For instance, the standard features can be used as features for training the model (e.g., by simply mapping a variable in the training data to a standard feature), which would save time and computing sources needed to extract these features from the dataset. As another example, search and optimization of a pipeline used in the machine learning process can be limited to the pipelines in the selected machine learning application so that the search and optimization is more efficient, compared with conventional machine learning processes. With the machine learning tools, the machine learning application 160 performs automated and industry specific machine learning.

In some embodiments, an industry specific machine learning application 160 may allow users to provide input to machine learning processes. For instance, it may allow users to map variables in a training dataset to standard features. It may also allow users to define values of certain parameters in the labeling function to customize the labeling function to a particular prediction sought by the user. This way, the industry specific machine learning application 160 takes advantage of both domain knowledge of the industry problem and the user's special knowledge in the dataset and in the particular prediction. Thus, compared with conventional machine learning techniques, the industry specific machine learning application 160 can train models that better fit needs of the industry and needs of users.

In some embodiments, the machine learning server 110 provides multiple industry specific machine learning applications 160 for display to a client device associated with the user. The machine learning server 110 allows the user to select one of the industry specific machine learning applications 160 for training a machine learning model. The user may be a person (e.g., a machine learning engineer, development engineer, etc.) who has knowledge associated with the machine learning model to be trained, such as predictions to be made by the model, data used to train the model, data used to make the predictions, and so on. The user selects a machine learning application 160 specific to an industrial problem relating to the predictions to be made by the model, e.g., the predictions fall under the scope of the industrial problem.

In some embodiment, the machine learning server 110 presents machine learning applications 160 in a user interface. A machine learning application 160 may be associated with a label indicating the industry problem corresponding to the machine learning application 160, so that a user may rely on the label to determine whether the machine learning application is proper for training a model needed by the user. In some embodiments, the machine learning server 110 supports one or more user interfaces, e.g., graphic user interfaces (GUI), that allow users to interact with the machine learning applications. For instance, the user interface provides options for the user to view the machine learning applications, download a machine learning application, interact with an online version of a machine learning application, uploading a dataset to a machine learning application, mapping variables in a dataset to standard features in a machine learning application, etc.

The data sources 120 provide electronic data to the machine learning server 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the machine learning server 110 and provide the data via the network 140. In addition, some or all data sources 120 may be directly coupled to the data analytics system and provide the data without passing the data through the network 140.

The data provided by the data sources 120 includes data used to train a machine learning model for solving an industrial problem and/or data for being inputted into a trained model to make predictions within the scope of an industrial problem. The data may be organized into data records (e.g., rows). Each data record includes one or more values. For example, a data record provided by a data source

120 may include a series of comma-separated values. The data describe information of relevance to an enterprise using the data analytics system 110. For example, data from a data source 120 can describe computer-based interactions (e.g., click tracking data) with content accessible on websites and/or with applications. As another example, data from a data source 120 can describe customer transactions online and/or in stores. The enterprise can be in one or more of various industries, such as computer technology, manufacturing, and so on.

The client devices 130 are one or more computing devices capable of receiving user input as well as transmitting and/or receiving data via the network 140. In one embodiment, a client device 130 is a conventional computer system, such as a desktop or a laptop computer. Alternatively, a client device 130 may be a device having computer functionality, such as a personal digital assistant (PDA), a mobile telephone, a smartphone, or another suitable device. The client devices 130 are configured to communicate with one or more data sources 120 and the machine learning server 110 via the network 140. In one embodiment, a client device 130 executes an application allowing a user of the client device 130 to interact with the machine learning server 110. For example, a client device 130 executes an application to enable interaction between the client device 130 and the machine learning applications 160 via the network 140, e.g., through by running a GUI supported by the machine learning server 110. The client device 130 includes or is otherwise associated with a display device that displays the GUI. The client device 130 is also associated with input devices, e.g., keyboard, mouse, etc., that allow the user to interact with the GUI, such as provide inputs to the GUI. In another embodiment, a client device 130 interacts with the machine learning server 110 through an application programming interface (API) running on a native operating system of the client device 130, such as IOS® or ANDROID™. The client device 130 may interact with one or more data sources 120 to transmit data to a data source 120 or obtain data from a data source 120.

The network 140 represents the communication pathways between the machine learning server 110 and data sources 120. In one embodiment, the network 140 is the Internet and uses standard communications technologies and/or protocols. Thus, the network 140 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
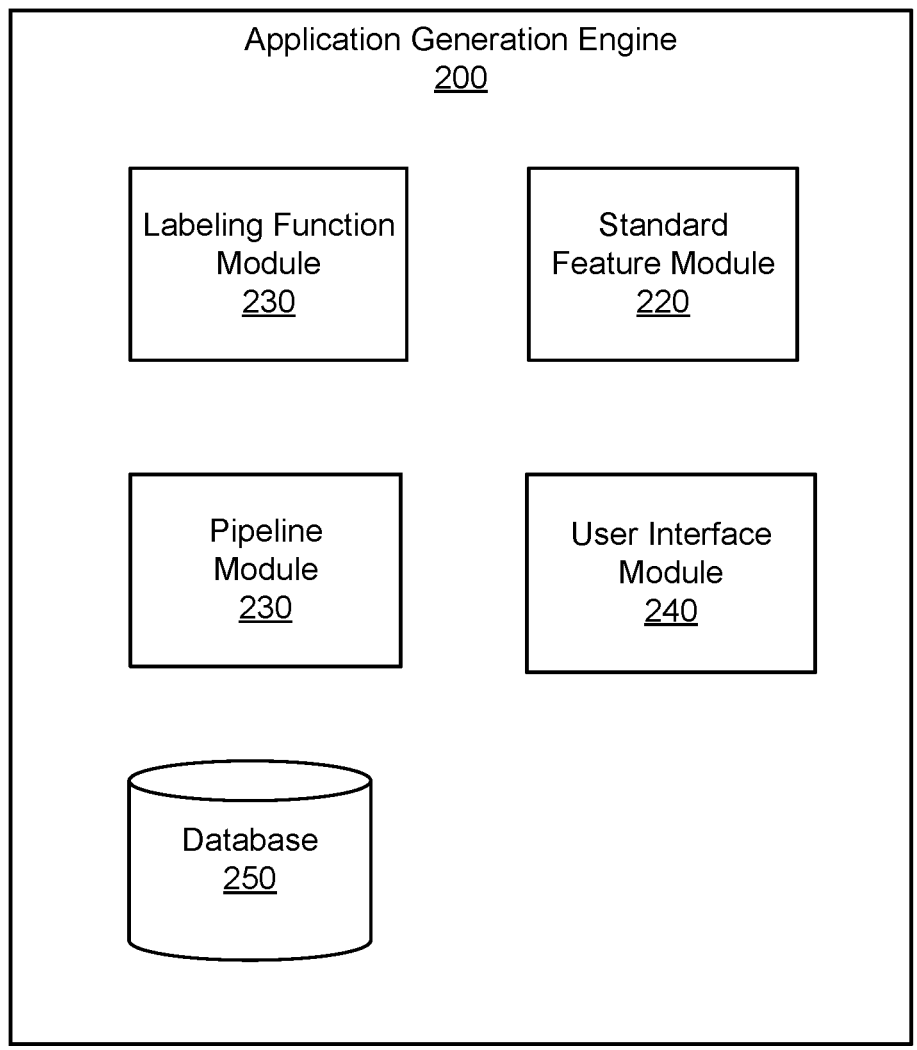
FIG. 2 is a block diagram illustrating an application generation engine that generates industry specific machine learning applications according to one embodiment.

FIG. 2 is a block diagram illustrating an application generation module 200 that generates industry specific machine learning applications according to one embodiment. The application generation engine 200 is an embodiment of the application generation engine 150 in FIG. 1. The application generation engine 200 generates industry specific machine learning applications that can be used to train models. The application generation engine 200 includes a labeling function module 210, a standard feature module 220, a pipeline module 230, a user interface module 240, and a database 250. Those of skill in the art will recognize that other embodiments can have different and/or other components than the ones described here, and that the functionalities can be distributed among the components in a different manner.

The labeling function module 210 obtains a labeling function specific to the industry problem. The labeling function is a function that when applied to a dataset creates label times from the dataset. The label times may be provided in a table (referred to as a "label times table"). A label time includes a cutoff time and a label associated with the cutoff time. A cutoff time is a time at which to make the prediction. Data associated with time stamps before the cutoff time can be used to extract features for the label. However, data associated with time stamps after the cutoff time should not be used to extract features for the label. A label associated with a cutoff time is a historical example of the target of the prediction (such as true or false) that is associated with the cutoff time. The label may be generated, by using the labeling function, based on data associated with time stamp(s) on and/or beyond the cutoff time. For instance, for a prediction about user action on a particular date, e.g., on the first of each month, the cutoff times are on the first of the month. Data associated with time stamps on the first of each month are applied to the labeling function to generate the labels, but cannot be used to generate features. All features must be generated by using data from before the cutoff times, e.g., data from the previous month.

The labeling function includes customizable parameters. Examples of the parameters include prediction date/time (i.e., cutoff date/time), prediction window (the period of time to make the prediction for), number of days or months (the time period in the future to be predicted), and so on. In some embodiment, the values of the parameters are customized, e.g., by a user who has domain knowledge of the prediction and/or industry problem, to create label times for different predictions in the scope of the industry problem. For instance, to make the prediction about user action on the first of each month, the prediction date can be the first of the month and the prediction window can be one month.

The standard feature module 220 generates industry specific standard features. For instance, for each machine learning application, the standard feature module 220 generates one or more standard features that are specific to the industry domain of the machine learning application, e.g., based on knowledge associated with the domain of the industry problem. In some embodiments, the standard feature module 220 generates standard features based on typical variables in datasets that users input to trained models for solving the industry problem. For example, for a machine learning application specific to next purchase prediction, the standard feature module 220 generates standard features associated with users (such as user ID, gender, birthday, zip code, etc.) and historical transactions (such as transaction ID, transaction date, transaction amount, product purchased, etc.). In some embodiments, the standard feature module 220 selects the standard features from a pool of features. The standard feature module 220 may select a standard feature from the pool based on the performance of the standard feature in historical training of models associated with the industry problem.

In some embodiments, the standard feature module 220 generates standard primitives to be applied to datasets to generate features. A standard primitive comprises an algorithm that when applied to data, performs a calculation on the data and generates the corresponding standard feature having an associated value. In one example, a standard primitive is a primitive that is default to the industry domain of the machine learning application. In another example, a standard primitive is selected from a pool of candidate primitives. For instance, the candidate primitives are ranked based on ranking of the features generated from the candidate primitives. A candidate primitive that generates a feature ranked higher (e.g., higher than the features generated from the other candidate primitive) is selected as the standard primitive. The algorithm of a standard primitive can be used to apply on different datasets that have different variables. Thus, the standard primitive can be reused on different datasets for training different machine learning models in the industry domain. More information about primitive and ranking features are described below in conjunction with FIG. 3.

The pipeline module 230 generates one or more pipelines that are specific to the industry problem. A pipeline is a workflow of the machine learning process to be performed by the machine learning application to train a model and specifies a sequence of steps to train the model. A machine learning pipeline may also specify tools (e.g., algorithm) to be used in the machine learning process, such as tools for data imputation, feature scaling, classification, and so on. In one example, the steps in a pipeline include data composing, feature engineering, model training, model validation, and model deployment. A step may include sub-steps. For instance, the step of data preparation may include data type setting, data encoding, and data imputation, the step of feature engineering may include feature selection and feature ranking, and the step of model training may include hyperparameters tuning and algorithm selection. Different pipelines include steps in different orders and/or different steps.

In some embodiments, the pipeline module 230 selects the pipelines from a pool of pipelines based on an objective function. An objective function is a function to be optimized (e.g., minimized for maximized). It measures how well the prediction objective/goal is reached. It may be a loss function or cost function. The pipeline module 230 may select the objective function from a pool of objective functions based on the domain of the industry problem. The objective function is specific to the domain. The pipeline module 230 applies the objective function to the pool of pipelines to select the plurality of pipelines. For instance, the pipeline module 230 ranks the pool of pipelines based on how well each pipeline optimizes the objective function and selects the plurality of pipelines from the pool of pipelines based on the ranking.

In some embodiments, the pipeline module 230 obtains pipeline templates and generates the pipelines specific to the industry problem from the pipeline templates. Each template includes a sequence of components. A component is a tool for performing a step in the machine learning process. Examples of components include data transformation tools, data type setting tool, data encoding tool, data imputation tool, feature selection tool, feature ranking tool, algorithm selection tool, and so on. A component is associated with one or more parameters. The value of a parameter can be changed or customized. Taking the feature ranking tool as an example, a parameter of the feature ranking tool is the number of decision trees used to rank features. The value of the parameter can be, e.g., 100, 200, 300, etc.

In some embodiments, the pipeline module 230 determines values of the parameters of the components in a pipeline template. In one example, the pipeline module 230 uses values that are default to the industry problem. In another example, the pipeline module 230 uses a machine learning model to determine the values of a parameter of a component. The machine learning model has been trained to determine values of parameters of components in machine learning pipelines. For instance, the pipeline module 230 inputs relevant information into the machine learning model and the machine learning model outputs the values of the parameters of one or more components in the pipeline template. The relevant information may include information of the pipeline template (information of the component in the pipeline template, information of other components in the pipeline template, etc.), information of the machine learning application, information of the industry problem, information received from a user of the machine learning application (e.g., expected accuracy of the model to be trained by using the pipeline template, expected duration of time needed to train a model by using the pipeline template, etc.), and so on.

The pipeline module 230 selects the pipelines from the pipeline templates by ranking the pipeline templates. For instance, the pipeline module 230 ranks the pipeline templates based on the accuracy of a machine learning model trained using each pipeline template and selects pipeline templates that have higher ranking. The pipeline module 230 may ranks the pipeline templates before and/or after it determines the values of the parameters of the components in the pipeline templates.

The user interface module 240 generates a user interface (e.g., a graphic user interface (GUI)) for an industry specific machine learning application. The user interface includes elements to be used by a user to interact with the machine learning application. Examples of the elements includes icons, tabs, checkboxes, buttons, dropdown lists, list boxes, radio buttons, switches, or other types of elements that the user may use to select or de-select an option; entry fields that the user may use to type in numbers, symbols, and/or text; presentation areas to present information to the user for the user's review; and so on. More details about the user interface are described below in conjunction with FIG. 3.

The database 250 stores data associated with the application generation engine 200, such as data received, used, or generated by the application generation engine 200. In some embodiments, the database 250 stores label functions, standard features, objective functions, machine learning pipelines, and so on.

Figure 3:
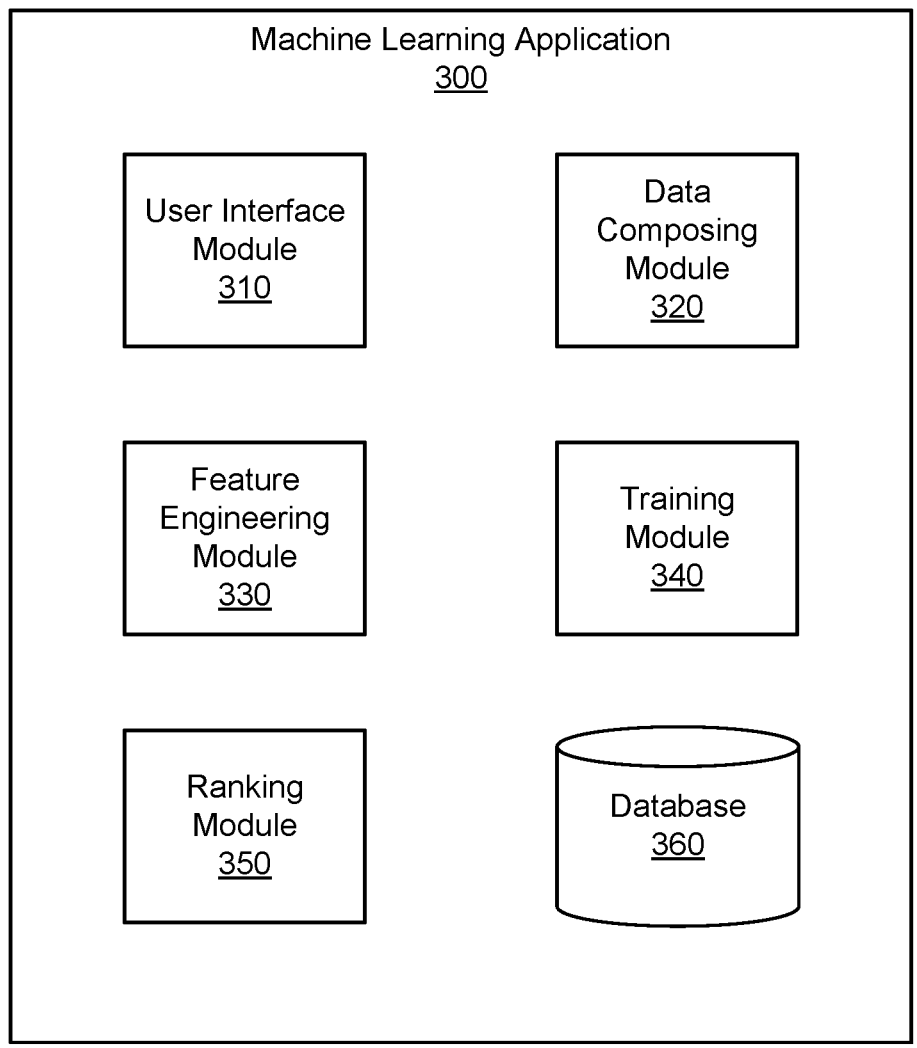
FIG. 3 is a block diagram illustrating an industry specific machine learning application according to one embodiment.

FIG. 3 is a block diagram illustrating an industry specific machine learning application 300 according to one embodiment. The machine learning application 300 is an embodiment of a machine learning application 160 in FIG. 1. The machine learning application 300 includes industry specific machine learning tools and is used for training models to make predictions in the scope of the industry problem. The machine learning application 300 includes a user interface module 310, a labeling module 320, a feature engineering module 330, a training module 340, a ranking module 350, and a database 360. Those of skill in the art will recognize that other embodiments can have different and/or other components than the ones described here, and that the functionalities can be distributed among the components in a different manner.

The user interface module 310 supports a user interface (such as a GUI) that allows the user to access and interact with the machine learning application 300. For instance, the user interface allows the user to load a dataset to the machine learning application, e.g., from a client device or from a data source. The user interface may allow the user to select a portion of the dataset for training the model, e.g., by allowing the user to specify a temporal range before a cutoff time so that data falling in the temporal range would be used to train the model.

The user interface allows the user to provide values of customizable parameters of the labeling function to the machine learning application 300. The values received from the user can be used to customize the machine learning process to a particular prediction sought by the user. In some embodiments, the user interface presents the customizable parameter to the user. The user interface may include one or more entry fields for a customizable parameter for the user to input a value of the customizable parameter. The user interface may also provide a dropdown list, from which a user can select a value for a customizable parameter. The user interface module 310 transmits the values of customizable parameters received from the user to the labeling module 320 for customizing the labeling function.

The user interface also presents standard features in the machine learning application 300 to the user and allows the user to map variables in the dataset to the standard features. In some embodiments, after receiving the dataset, the user interface module 310 identifies variables in the dataset. The user interface module 310 may provide all or some of the variables for display to the user in the user interface so that the user can select a variable and map the variable to a standard feature. The user interface receives the user's mapping and transmits the mapping to the feature engineering module 320.

The user interface may also allow the user to make other selections to influence the machine learning process, such as editing the dataset, selecting data types for variables, defining and/or tuning hyperparameters, providing other guidance to the machine learning process, or some combination thereof. In some embodiments, the user interface provides a visual representation of the machine learning process, e.g., a visual representation of a machine learning pipeline, for presentation to the user.

The labeling module 320 generates label times from the dataset by applying the labeling function in the machine learning application 300 to the dataset. Each label time includes a label and a cutoff time that is associated with the label. A label is a historical example of the target of the prediction. The labels will be used as targets in a supervised machine learning process performed by the training module 340. The cutoff time indicates when to stop using data to make features for a label. In an example where the prediction is whether customer churn on the first of each month, the cutoff time is on the first of the month as shown in the label times table. All the features for each label must use data from before this time to prevent data leakage.

In some embodiments, the labeling module 320 customizes the labeling function based on values of customizable parameters of the labeling function that may be received from a user through the user interface. The values provided by the user can be specific to the particular prediction, for which a model is to be trained and which falls within the scope of the industry problem. As the user has knowledge of the particular prediction for which a model is to be trained, the labeling module 320 incorporates such knowledge of the user so that the model to be trained is tailored to the particular prediction sought by the user.

The feature engineering module 330 generates features based on data in the dataset associated with time stamps before the cutoff times. A feature may be a standard feature in the machine learning application 300 that is mapped to a variable in the dataset by a user, e.g., through the user interface. A feature may also be extracted from the dataset by the feature engineering module 330. For instance, the feature engineering module 330 identifies a variable in the dataset that is not mapped to any standard feature by the user and generates a feature from the variable.

To extract features, the feature engineering module 330 may select one or more primitives from a pool of primitives maintained by the machine learning application 300. The pool of primitives includes a large number of primitives, such as hundreds or thousands of primitives. Each primitive comprises an algorithm that when applied to data, performs a calculation on the data and generates a feature having an associated value. A primitive is associated with one or more attributes. An attribute of a primitive may be a description of the primitive (e.g., a natural language description specifying a calculation performed by the primitive when it is applied to data), input type (i.e., type of input data), return type (i.e., type of output data), metadata of the primitive that indicates how useful the primitive was in previous feature engineering processes, or other attributes.

In some embodiments, the pool of primitives includes multiple different types of primitives. One type of primitive is an aggregation primitive. An aggregation primitive, when applied to a dataset, identifies related data in the dataset, performs a determination on the related data, and creates a value summarizing and/or aggregating the determination. For example, the aggregation primitive "count" identifies the values in related rows in the dataset, determines whether each of the values is a non-null value, and returns (outputs) a count of the number of non-null values in the rows of the dataset. Another type of primitive is a transformation primitive. A transformation primitive, when applied to the dataset, creates a new variable from one or more existing variables in the dataset. For example, the transformation primitive "weekend" evaluates a timestamp in the dataset and returns a binary value (e.g., true or false) indicating whether the date indicated by the timestamp occurs on a weekend. Another exemplary transformation primitive evaluates a timestamp and returns a count indicating the number of days until a specified date (e.g., number of days until a particular holiday).

The feature engineering module 330 selects a set of primitives based on a dataset. In some embodiments, the feature engineering module 330 uses a skim view approach, a summary view approach, or both approaches to select primitives. In the skim view approach, the feature engineering module 330 identifies one or more semantic representations of the dataset. A semantic representation of the dataset describes a characteristic of the dataset and may be obtained without performing calculations on data in the dataset. Examples of semantic representations of the dataset include the presence of one or more particular variables (e.g., a name of a column) in the dataset, a number of columns, a number of rows, an input type of the dataset, other attributes of the dataset, and some combination thereof. To select a primitive using a skim view approach, the feature engineering module 330 determines whether an identified semantic representation of the dataset matches an attribute of a primitive in the pool. If there is a match, the feature engineering module 330 selects the primitive.

The skim view approach is a rule-based analysis. The determination of whether an identified semantic representation of the dataset matches an attribute of a primitive is based on rules maintained by the feature engineering application 200. The rules specify which semantic representations of dataset match which attributes of primitive, e.g., based on matching of key words in semantic representations of dataset and in attributes of primitive. In one example, a semantic representation of the dataset is a column name "date of birth", the feature engineering module 330 selects a primitive whose input type is "date of birth," which matches the semantic representation of the dataset. In another example, a semantic representation of the dataset is a column name "timestamp," the feature engineering module 330 selects a primitive having an attribute indicating the primitive is appropriate for use with data indicating a timestamp.

In the summary view approach, the feature engineering module 330 generates a representative vector from the dataset. The representative vector encodes data describing the dataset, such as data indicating number of tables in the dataset, number of columns per table, average number of each column, and average number of each row. The representative vector thus serves as a fingerprint of the dataset. The fingerprint is a compact representation of the dataset and may be generated by applying one or more fingerprint functions, such as hash functions, Rabin's fingerprinting algorithm, or other types of fingerprint functions to the dataset.

The feature engineering module 330 selects primitives for the dataset based on the representative vector. For instance, the feature engineering module 330 inputs the representative vector of the dataset into a machine learned model. The machine learned model outputs primitives for the dataset. The machine learned model is trained, e.g., by the feature engineering module 330, to select primitives for datasets based on representative vectors. It may be trained based on training data that includes a plurality of representative vectors of a plurality of training datasets and a set of primitives for each of the plurality of training datasets. The set of primitives for each of the plurality of training datasets have been used to generate features determined useful for making a prediction based on the corresponding training dataset. In some embodiments, the machine learned model is continuously trained. For example, the feature engineering module 330 can further train the machine learned model based on the representative vector of the dataset and at least some of the selected primitives.

The feature engineering module 330 synthesizes a plurality of features based on the selected primitives and the dataset. In some embodiments, the feature engineering module 330 applies each of the selected primitives to at least a portion of the dataset to synthesize one or more features. For instance, the feature engineering module 330 applies a "weekend" primitive to a column named "timestamp" in the dataset to synthesize a feature indicating whether or not a date occurs on a weekend. The feature engineering module 330 can synthesize a large number of features for the dataset, such as hundreds or even millions of features.

The feature engineering module 330 evaluates the features and removes some of the features based on the evaluation to obtain the group of features. In some embodiments, the feature engineering module 330 evaluates the features through an iterative process. In each round of the iteration, the feature engineering module 330 applies the features that were not removed by previous iterations (also referred to as "remaining features") to a different portion of the dataset and determines a usefulness score for each of the features. The feature engineering module 330 removes some features that have the lowest usefulness scores from the remaining features. In some embodiments, the feature engineering module 330 determines the usefulness scores of features by using random forests.

The feature engineering module 330 ranks the features (including the mapped standard features and/or features generated from unmapped variables) and determines a ranking score for each feature. The ranking score of a feature indicates how important the feature is for predicting the target variable, in other words, how good the feature is as a predictor. In some embodiments, the feature engineering module 330 constructs a random forest based on the features and the dataset. The feature engineering module 330 determines a ranking score of a feature based on each decision tree in the random forest and obtains an average of the individual ranking scores as the ranking score of the feature. The feature engineering module 330 may use GINI impurity as part of each decision tree to measure how much a feature contributes to the whole predictive model. The ranking score of a feature determined by using the random forest indicates how important the feature is relative to the other features and are referred to as "relative ranking score." In one example, the ranking module 330 determines that the relative ranking scores of the highest ranked selected feature is 1. The ranking module 330 then determines a ratio of the ranking score of each of the rest of the features to the ranking score of the highest ranked feature as the relative ranking scores of the corresponding selected feature.

The feature engineering module 330 may determine absolute ranking score for each selected feature, e.g., based on Goodman-Kruskal Tau (GKT) measure. GKT measure is a measure of association that is local or absolute and indicates how well a feature predicts a target. The feature engineering module 330 may select a subset of the group of features based on their relative ranking scores and/or absolute ranking scores as features to train the model.

The feature engineering module 330 also determines an importance factor for each selected feature, e.g., based on the relative and/or absolute ranking score of the selected feature. The importance factor indicates how important/relevant the feature is to the target prediction. The feature engineering module 330 also generates values of each selected feature, e.g., by applying a transformer to corresponding data in the dataset associated with time stamps before the cutoff times. The feature engineering module 330 transmits the selected features, their importance factors, and their values (referred to together as "feature matrix") to the training module 340 to train models.

The training module 340, by using each machine learning pipeline in the machine learning application 300, trains a model based on the labels from the labeling module 320 and the feature matrix from the feature engineering module 330.

In the process of training a model, the training module 340 may detect missing values and performs data imputation to supply the values. In some embodiments, the training module 340 determines new values based on the present values to replace the missing values. For instance, for each feature or label that has missing values, the training module 340 replaces the missing values with the mean or median of the present values, with the most frequent values, or with values from new data samples. The training module 340 may use other imputation methods, such as k-Nearest Neighbor (kNN) imputation, hot deck imputation, cold deck imputation, regression imputation, Stochastic regression imputation, extrapolation and interpolation, single imputation, multiple imputation, Multivariate Imputation by Chained Equation (MICE), imputation using Deep Neural Networks, and so on.

The training module 340 may also perform feature scaling, e.g., by normalizing or standardizing values of the features. In some embodiments, the training module 340 scales the value ranges of the features based on the importance factors of the features. For instance, the value range of a feature having a higher importance factors are scaled to be higher than the value range of another feature having a lower importance factor. For a feature has a relatively high value range than other features, the training module may decrease the value range of the feature to avoid the feature dominating over other features during the training process. The training module 340 can use various methods for feature scaling, such as Min Max Scaler, Standard Scaler, Max Abs Scaler, Robust Scaler, Quantile Transformer Scaler, Power Transformer Scaler, Unit Vector Scaler, and so on.

The training module 340 also obtains an algorithm that implements classification. The training module 340 may select the algorithm from a pool of candidate algorithms. Examples of a candidate algorithms include, e.g., decision tree, logistic regression, random forest, XGBoost, linear support vector machine (linear SVM), AdaBoost, neural networks, naïve Bayes, memory-based learning, random forests, bagged trees, boosted trees, boosted stumps, and so on. In some embodiments, the training module 340 may constrain the number of candidate algorithms in the pool based on available information, e.g., time limit for training the model, computational resource limitations (e.g., processor limitations, memory usage limitations, etc.), the predictive problem to be solved, characteristics of the dataset, selected features, and so on. The training module 340 may test each candidate algorithm and select the best one.

The training module 340 trains the model by using the classification algorithm. As there are a plurality of machine learning pipelines in the machine learning application, the training module 340 trains a plurality of models.

The ranking module 350 ranks the plurality of trained models. In some embodiments, the ranking module 350 defines a testing harness associated with a performance measure (e.g., classification accuracy) to assess performance of the trained models. For example, the ranking module 350 applies a trained model to a testing set to quantify the accuracy of the trained model. The testing set includes data different from the data used to train the model. In some embodiment, the machine learning application 300 splits the labels and feature matrix into a training set and a testing set. The training set is provided to the training module 340 to train the models, and the testing set is provided to the ranking module 350 to rank the models.

Common metrics applied in accuracy measurement include: Precision=TP/(TP+FP) and Recall=TP/(TP+FN), where precision is how many outcomes the model correctly predicted (TP or true positives) out of the total it predicted (TP+FP or false positives), and recall is how many outcomes the model correctly predicted (TP) out of the total number that actually occurred (TP+FN or false negatives). The F score (F-score=2*PR/(P+R)) unifies precision and recall into a single measure.

The outcome of testing the trained models against the testing harness estimates how the trained models perform on the predictive problem against the performance measures. The ranking module 350 may determine a ranking score for each trained model, the ranking score indicates the measured performance and/or accuracy of the trained model. The ranking module 350 selects one of the trained models based on the ranking, e.g., the training model having the best performance.

The ranking module 370 then deploys the selected trained model so that the selected trained model can be used to make prediction based on new data. In some embodiments, the ranking module 370 transmits artifacts to a database in a computer system, e.g., a server of an organization in the industry associated with the industrial problem. The artifacts are output created by the machine learning process and include, for example, the selected trained model, other trained models, model checkpoints, features, labels, and so on. The computer system further provides the selected trained model to other computer systems where the selected trained model is used to make prediction based on new data.

The database 360 stores data associated with the machine learning application 300, such as data received, used, and generated by the machine learning application 300. For instance, the database 360 stores the dataset, standard features, feature matrix, transformers, label times, training set, testing set, machine learning pipelines, decisions made in the steps of each machine learning pipeline, algorithms, hyperparameters, trained models, ranking scores of the trained models, and so on.

Figure 4A:
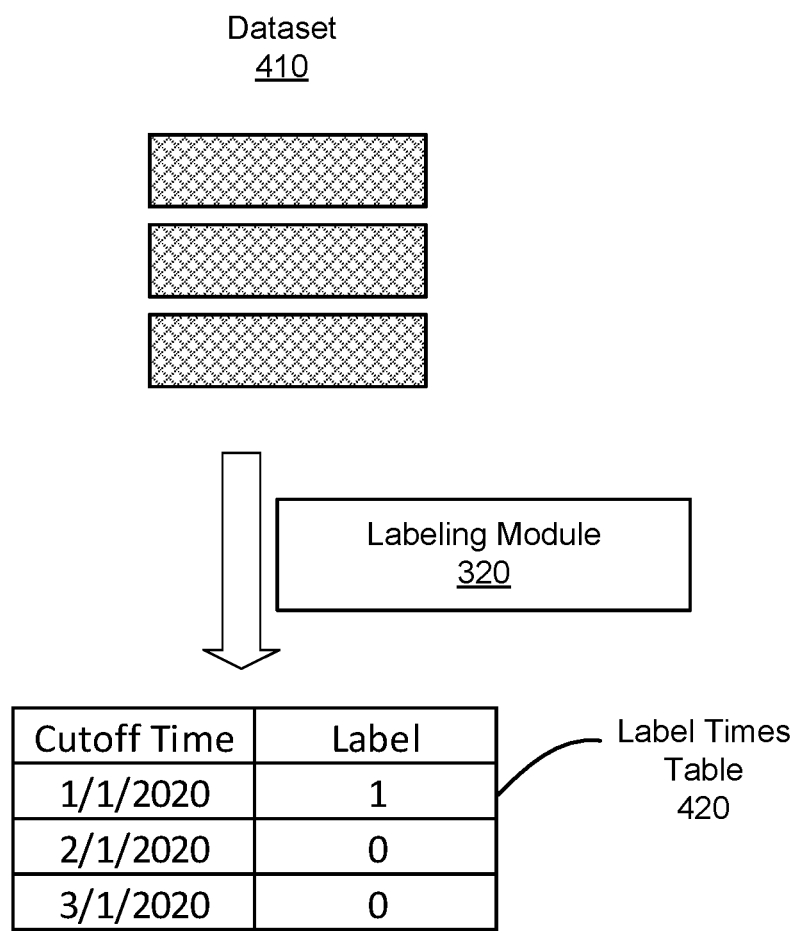
FIGS. 4A-C illustrates training a model from a dataset by using the industry specific machine learning application of FIG. 3 according to one embodiment.
Figure 4B:
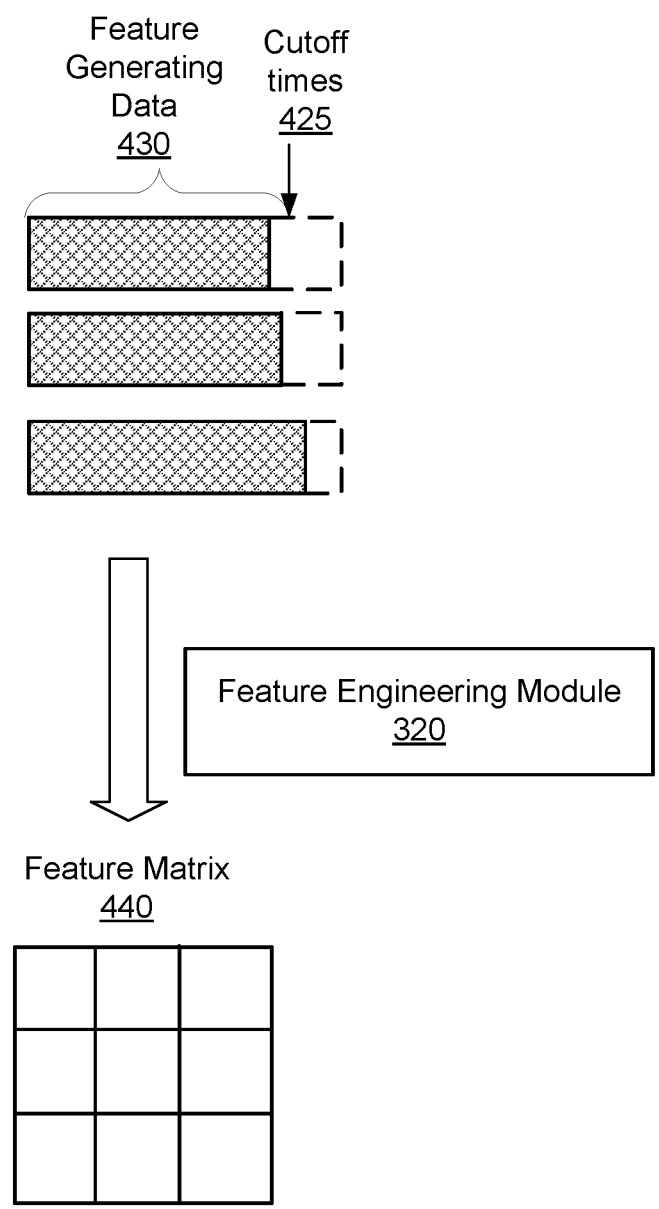
Figure 4C:
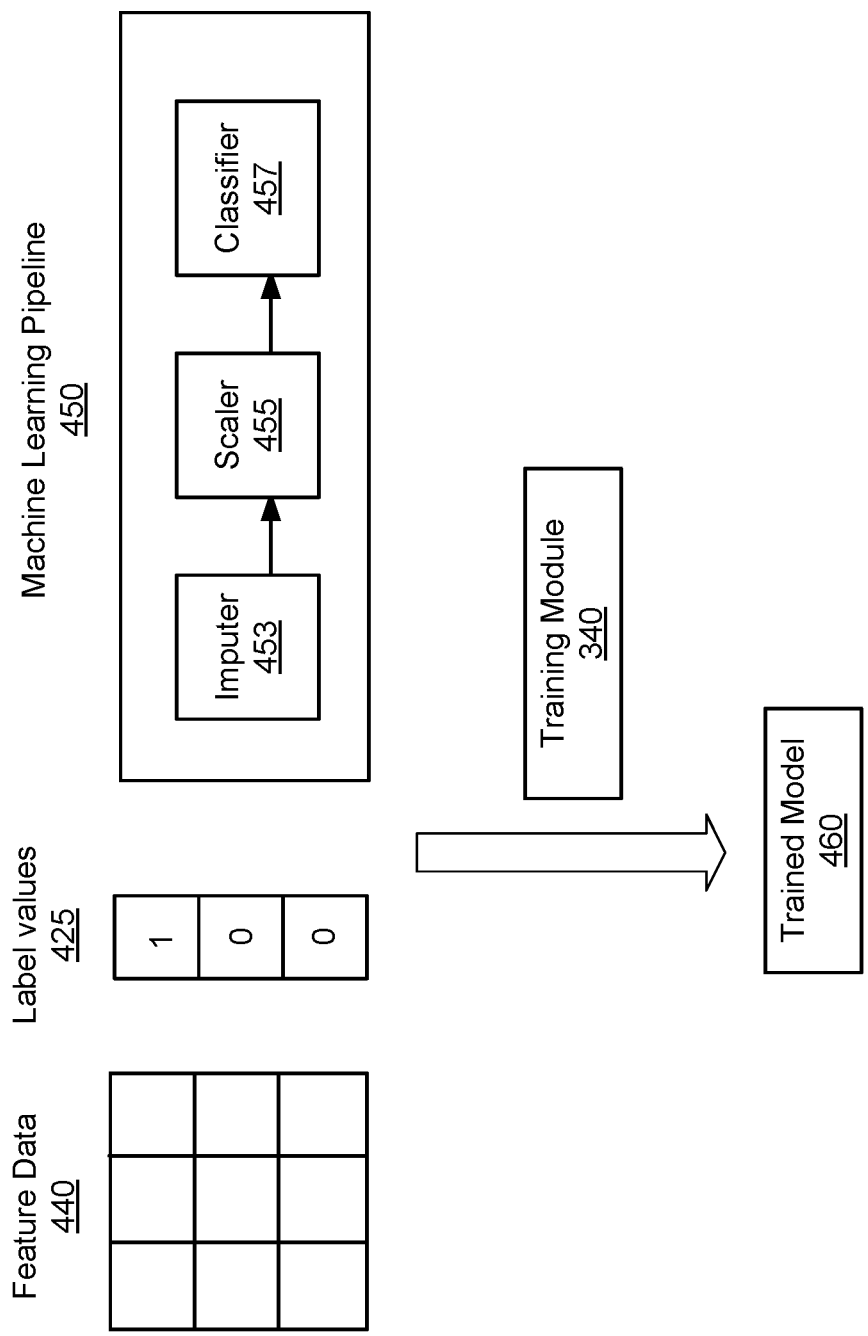

FIGS. 4A-C illustrates training a model from a dataset by using the industry specific machine learning application 300 according to one embodiment. In FIG. 4A, the dataset 410 is inputted into the labeling module 320, and the labeling module 320 outputs a label times table 420. The label times table 420 includes labels, each of which is associated with a cutoff time.

In FIG. 4B, feature generating data 430 is inputted into the feature engineering module 320, which outputs a feature matrix 440. The feature generating data 430 includes a portion of or all of the data in the dataset that is associated with time stamps before the cutoff times. The feature matrix 440 includes a plurality of features, values of the features, and importance factors of the features. Some of the plurality of features are standard features that are included in the machine learning application 300, provided by the machine learning application 300 to a user, and mapped by the user to variables in the dataset.

In FIG. 4C, the feature matrix 440, label values 425 from the label times table 420, and a machine learning pipeline 450 are inputted into the training module 340. The machine learning pipeline 450 includes an imputer 453, a scaler 455, and a classifier 457. The machine learning pipeline 450 is one of a plurality of machine learning pipelines in the machine learning application 300. The plurality of machine learning pipelines are specific to the industry problem. The training module 340 trains a model 460 by using a machine learning pipeline 450: the training module 340 uses the imputer 453 to detect missing values and supply new values for the missing values; the training module 340 uses the scaler 455 to scale value range of the features; and the training module 340 uses the classifier 457 to perform supervised machine learning.

The training module 340 also generates a trained model by using each of the other machine learning pipelines in the machine learning application 300. In some embodiments, those trained models are ranked based on their predictive performance and the trained model that is determined to have the best performance are deployed and used to make prediction based on new data.

FIG. 5 is a flow chart illustrating a method 500 for generating a model for making a prediction for an industrial problem according to one embodiment. In some embodiments, the method is performed by a machine learning application 160, although some or all of the operations in the method may be performed by other entities in other embodiments. In some embodiments, the operations in the flow chart are performed in different orders and include different and/or additional steps.

The machine learning application 160 receives 510 a dataset for generating the model. The dataset can be received from a client device associated with the user or received from a data source, e.g., one of the data sources 120 in FIG. 1. The machine learning application 160 is selected from a plurality of machine learning applications based on the industrial problem. Each of the plurality of machine learning applications corresponds to a different industrial problem and includes standard features specific to the corresponding industrial problem and machine learning pipelines specific to the corresponding industrial problem. Example industry problems include application monitoring, service level agreement violation detection, user action prediction, and so on.

In some embodiments, the standard features have previously been generated and/or selected by a machine learning server 110 based on the industry problem. A standard feature can be a feature that has been proved important in historical training of models for solving the industry problem, a variable that is common in datasets used for training models for solving the industry problem, a feature that is logically related to the industry problem, or some combination thereof.

In some embodiments, the machine learning pipelines have previously been generated by the machine learning server 110 based on a domain of the industrial problem. For instance, the machine learning server 110 identified the domain of the industrial problem based on a description of the industrial problem. The domain is associated with a type of business. The machine learning server 110 selected an objective function from a plurality of objective functions based on the identified domain. Each of the plurality of objective functions is specific to a respective domain and used to select optimal machine learning pipelines for predictions in the respective domain. The machine learning server 110 then applied the objective function to a pool of machine learning pipelines to select the machine learning pipelines in the respective machine learning application from the pool of machine learning pipelines.

The machine learning application 160 provides 520 the standard features in the machine learning application for display to a client device associated with user. In some embodiments, machine learning application 160 provides 520 the standard features in a user interface. The user interface allows the user associated with the client device to map variables in the dataset to the standard features in the selected machine learning application. In some embodiments, the user interface allows the user to map one variable in the dataset to one standard feature, map multiple variables in the dataset to one standard features, and/or map one variable in the dataset to multiple standard features.

The machine learning application 160 receives 530, from the client device and in response to providing the standard features, a mapping of variables in the dataset to standard features in the selected machine learning application. For instance, the machine learning server 110 receives the user's mapping a variable "user name" to a standard feature "ID." After the machine learning server 110 receives the mapping, the machine learning server 100 may convert values of the variable to new values as values of the standard feature. For instance, the variable "user name" includes a plurality of textual strings representing names of users, the machine learning server converts the textual strings to numerical values as values of the standard feature "ID."

The machine learning application 160 applies 540 the machine learning pipelines in the machine learning application 160 to the dataset to train a plurality of models based at least on the mapping. Each machine learning pipeline specifies steps of the training process. In some embodiments, the training process includes data imputation, feature scaling, and classification.

In some embodiments, the machine learning application 160 generates a plurality of features including one or more standard features in the selected machine learning application mapped to the one or more variables in the dataset and one or more other features. The machine learning application 160 extracts the one or more other features from variables in the dataset that are not mapped to any of the standard features. To extract such a feature, the machine learning application 160 can identify a variable in the dataset that is not mapped to any of the pool of standard feature, select a primitive from a pool of primitives based on the identified variable, and apply the primitive to the variable.

The machine learning application 160 ranks 550 the plurality of trained models. In some embodiments, the machine learning application 160 ranks 570 the trained models by defining a testing harness associated with a performance measure (e.g., classification accuracy) and ranking the trained models based on their performances. The performance of each trained model can be measured by inputting a testing set into the trained model and comparing output of the trained model with known prediction results associated with the testing set.

The machine learning application 160 selects 560 the generated model from the plurality of trained models based on the ranking. The selected trained model is to be used to make the prediction on new data.

Figure 6:
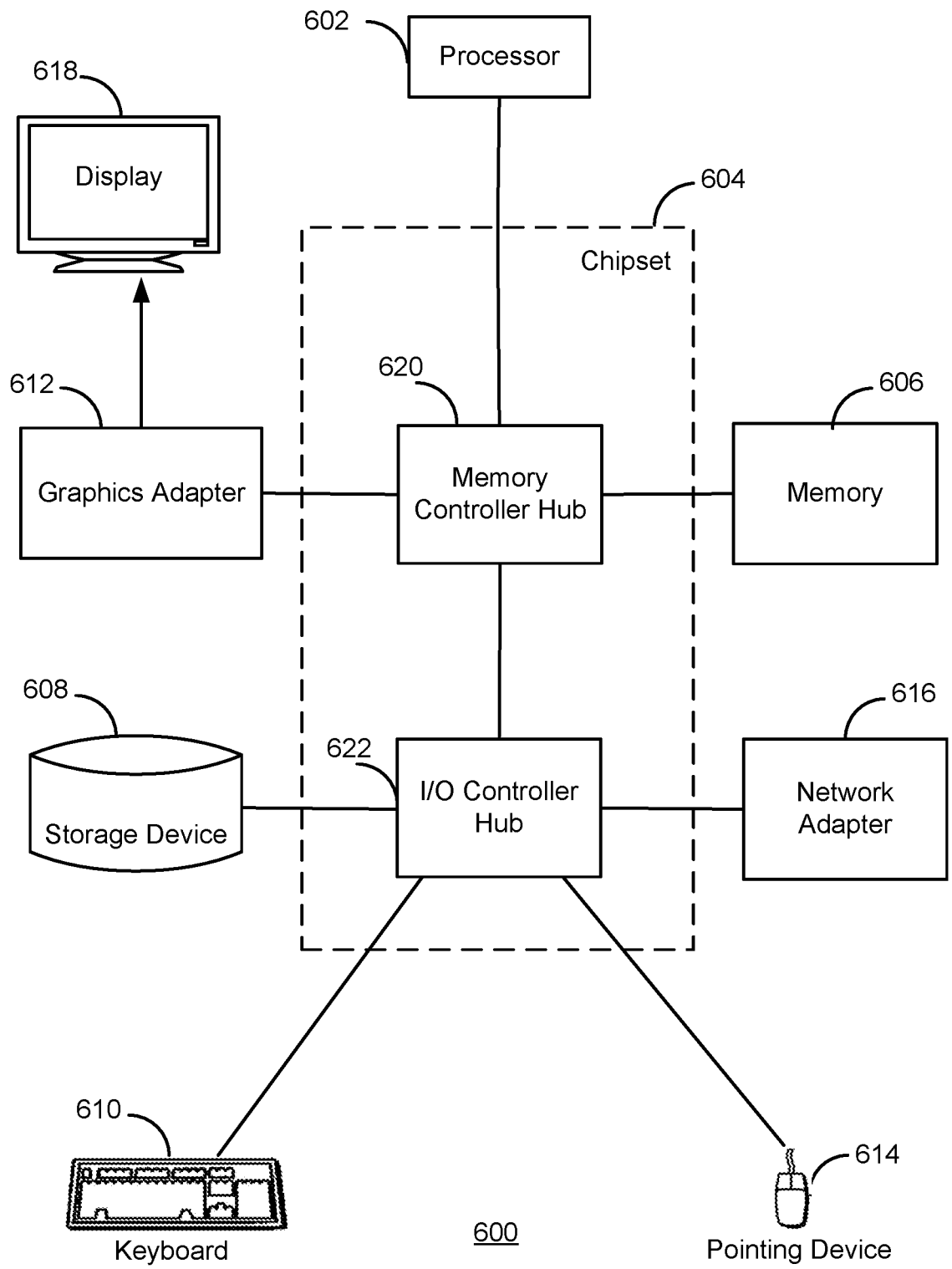
FIG. 6 is a high-level block diagram illustrating a functional view of a typical computer system for use as the machine learning server of FIG. 1 according to an embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method comprising:
   receiving, by a computing device, a dataset for generating a trained machine learning model;
   outputting, by the computing device, a user interface that includes:
      a display of a plurality of variables represented in the dataset; and
      a display of a plurality of standard features for a problem domain;
   receiving, by the computing device, input via the user interface mapping at least one of the plurality of variables to at least one of the plurality of standard features;
   generating, by the computing device, at least one synthesized feature for the dataset by:
      identifying one of the plurality of variables represented in the dataset that is not mapped via the input to one of the plurality of standard features for the problem domain;
      selecting a primitive from a pool of primitives based on the identified one of the plurality of variables, the primitive comprising a function configured to convert a variable to a feature; and
      applying the primitive to the identified one of the plurality of variables to produce the at least one synthesized feature;
   generating, by the computing device, a feature matrix that includes the at least one synthesized feature and the at least one of the plurality of standard features mapped via the input to the at least one of the plurality of variables;
   generating, by the computing device, a plurality of machine learning models, each of the plurality of machine learning models being trained using the feature matrix and a different classification algorithm;
   ranking, by the computing device, the plurality of machine learning models; and
   outputting, by the computing device, one of the plurality of machine learning models as the trained machine learning model based on the ranking.

2. The method of claim 1, further comprising:
   identifying a semantic representation of the dataset; and
   selecting the primitive from the pool of primitives based on the semantic representation of the dataset having at least one attribute that matches the primitive.

3. The method of claim 1, further comprising:
   generating a representative vector for the dataset that encodes data describing the dataset; and
   selecting the primitive from the pool of primitives by inputting the representative vector to a machine learning model trained to output one or more primitives given an input vector.

4. The method of claim 3, wherein the data describing the dataset encoded in the representative vector describes at least one of a number of tables in the dataset, a number of columns per table in the dataset, an average number of columns for one or more tables in the dataset, or an average number of rows for one or more tables in the dataset.

5. The method of claim 3, wherein generating the representative vector for the dataset comprises applying a hash function to the dataset or applying a Rabin's fingerprinting algorithm to the dataset.

6. The method of claim 1, wherein generating the feature matrix that includes the at least one synthesized feature and the at least one of the plurality of standard features mapped via the input to the at least one of the plurality of variables comprises:
   determining an absolute ranking score for each of the at least one synthesized feature and the at least one of the plurality of standard features mapped via the input to the at least one of the plurality of variables;
selecting, based on the respective absolute ranking scores, a subset of features from the at least one synthesized feature and the at least one of the plurality of standard features mapped via the input to the at least one of the plurality of variables; and
generating the feature matrix to include the subset of features.

7. The method of claim 6, wherein determining the absolute ranking score for each of the at least one synthesized feature and the at least one of the plurality of standard features mapped via the input to the at least one of the plurality of variables is performed using a Goodman-Kruskal Tau measure.

8. The method of claim 6, further comprising determining an importance factor for each of the at least one synthesized feature and the at least one of the plurality of standard features mapped via the input to the at least one of the plurality of variables, wherein selecting the subset of features is further performed based on the respective importance factors.

9. The method of claim 8, wherein determining the importance factor for each of the at least one synthesized feature and the at least one of the plurality of standard features mapped via the input to the at least one of the plurality of variables is performed using a transformer.

10. A non-transitory computer-readable memory storing instructions that are executable by at least one processor to perform operations comprising:
receiving a dataset for generating a trained machine learning model;
outputting a user interface that includes:
a display of a plurality of variables represented in the dataset; and
a display of a plurality of standard features for a problem domain;
receiving input via the user interface mapping at least one of the plurality of variables to at least one of the plurality of standard features;
generating at least one synthesized feature for the dataset by:
identifying one of the plurality of variables represented in the dataset that is not mapped via the input to one of the plurality of standard features for the problem domain;
selecting a primitive from a pool of primitives based on the identified one of the plurality of variables, the primitive comprising a function configured to convert a variable to a feature; and
applying the primitive to the identified one of the plurality of variables to produce the at least one synthesized feature;
generating a feature matrix that includes the at least one synthesized feature and the at least one of the plurality of standard features mapped via the input to the at least one of the plurality of variables;
generating a plurality of machine learning models, each of the plurality of machine learning models being trained using the feature matrix and a different classification algorithm;
ranking the plurality of machine learning models; and
outputting one of the plurality of machine learning models as the trained machine learning model based on the ranking.

11. The non-transitory computer-readable memory of claim 10, the operations further comprising:

identifying a semantic representation of the dataset; and
selecting the primitive from the pool of primitives based on the semantic representation of the dataset having at least one attribute that matches the primitive.

12. The non-transitory computer-readable memory of claim 10, the operations further comprising:
generating a representative vector for the dataset that encodes data describing the dataset; and
selecting the primitive from the pool of primitives by inputting the representative vector to a machine learning model trained to output one or more primitives given an input vector.

13. The non-transitory computer-readable memory of claim 10, wherein generating the feature matrix that includes the at least one synthesized feature and the at least one of the plurality of standard features mapped via the input to the at least one of the plurality of variables comprises:
determining an absolute ranking score for each of the at least one synthesized feature and the at least one of the plurality of standard features mapped via the input to the at least one of the plurality of variables;
selecting, based on the respective absolute ranking scores, a subset of features from the at least one synthesized feature and the at least one of the plurality of standard features mapped via the input to the at least one of the plurality of variables; and
generating the feature matrix to include the subset of features.

14. A system, comprising:
at least one processor; and
a computer-readable storage medium storing instructions that are executed by the at least one processor to perform operations comprising:
receiving a dataset for generating a trained machine learning model;
outputting a user interface that includes:
a display of a plurality of variables represented in the dataset; and
a display of a plurality of standard features for a problem domain;
receiving input via the user interface mapping at least one of the plurality of variables to at least one of the plurality of standard features;
generating at least one synthesized feature for the dataset using a subset of the plurality of variables not mapped via the input to the plurality of standard features;
generating a feature matrix that includes the at least one synthesized feature and the at least one of the plurality of standard features mapped via the input to the at least one of the plurality of variables;
generating a plurality of machine learning models, each of the plurality of machine learning models being trained using the feature matrix and a different classification algorithm;
ranking the plurality of machine learning models; and
outputting one of the plurality of machine learning models as the trained machine learning model based on the ranking.

15. The system of claim 14, wherein generating the at least one synthesized feature for the dataset using the subset of the plurality of variables not mapped via the input to the plurality of standard features comprises:
identifying one of the plurality of variables represented in the dataset that is not mapped via the input to one of the plurality of standard features for the problem domain;

selecting a primitive from a pool of primitives based on the identified one of the plurality of variables, the primitive comprising a function configured to convert a variable to a feature; and applying the primitive to the identified one of the plurality of variables to produce the at least one synthesized feature.

16. The system of claim 15, the operations further comprising:

identifying a semantic representation of the dataset; and selecting the primitive from the pool of primitives based on the semantic representation of the dataset having at least one attribute that matches the primitive.

17. The system of claim 15, the operations further comprising:

generating a representative vector for the dataset that encodes data describing the dataset; and selecting the primitive from the pool of primitives by inputting the representative vector to a machine learning model trained to output one or more primitives given an input vector.

18. The system of claim 14, wherein generating the feature matrix that includes the at least one synthesized feature and the at least one of the plurality of standard features mapped via the input to the at least one of the plurality of variables comprises:

determining an absolute ranking score for each of the at least one synthesized feature and the at least one of the plurality of standard features mapped via the input to the at least one of the plurality of variables;

selecting, based on the respective absolute ranking scores, a subset of features from the at least one synthesized feature and the at least one of the plurality of standard features mapped via the input to the at least one of the plurality of variables; and generating the feature matrix to include the subset of features.

19. The system of claim 18, wherein determining the absolute ranking score for each of the at least one synthesized feature and the at least one of the plurality of standard features mapped via the input to the at least one of the plurality of variables is performed using a Goodman-Kruskal Tau measure.

20. The system of claim 18, further comprising determining an importance factor for each of the at least one synthesized feature and the at least one of the plurality of standard features mapped via the input to the at least one of the plurality of variables, wherein selecting the subset of features is further performed based on the respective importance factors.

* * * * *